United States Patent
Saito et al.

(10) Patent No.: US 10,414,962 B2
(45) Date of Patent: Sep. 17, 2019

(54) WORKING FLUID COMPOSITION FOR REFRIGERATOR

(71) Applicant: JXTG NIPPON OIL & ENERGY CORPORATION, Tokyo (JP)

(72) Inventors: Masanori Saito, Tokyo (JP); Takeshi Okido, Tokyo (JP); Souichirou Konno, Tokyo (JP); Kuniko Adegawa, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 16/172,297

(22) Filed: Oct. 26, 2018

(65) Prior Publication Data

US 2019/0062613 A1     Feb. 28, 2019

Related U.S. Application Data

(62) Division of application No. 14/387,079, filed as application No. PCT/JP2013/058587 on Mar. 25, 2013, now Pat. No. 10,144,855.

(30) Foreign Application Priority Data

Mar. 27, 2012 (JP) ................................ 2012-072310
Jul. 13, 2012 (JP) ................................ 2012-157976

(51) Int. Cl.
| | |
|---|---|
| C09K 5/04 | (2006.01) |
| C10M 107/34 | (2006.01) |
| C10M 105/18 | (2006.01) |
| C10M 105/38 | (2006.01) |
| C10M 107/24 | (2006.01) |
| C10M 171/00 | (2006.01) |

(52) U.S. Cl.
CPC ........... *C09K 5/045* (2013.01); *C10M 105/18* (2013.01); *C10M 105/38* (2013.01); *C10M 107/24* (2013.01); *C10M 107/34* (2013.01); *C10M 171/008* (2013.01); *C09K 2205/106* (2013.01); *C09K 2205/12* (2013.01); *C09K 2205/126* (2013.01); *C09K 2205/22* (2013.01); *C10M 2207/2835* (2013.01); *C10M 2209/043* (2013.01); *C10M 2209/1033* (2013.01); *C10M 2209/1045* (2013.01); *C10M 2209/1055* (2013.01); *C10M 2209/1085* (2013.01); *C10N 2220/302* (2013.01); *C10N 2220/306* (2013.01); *C10N 2230/10* (2013.01); *C10N 2230/70* (2013.01); *C10N 2240/30* (2013.01)

(58) Field of Classification Search
None
See application file for complete search history.

(56) References Cited

U.S. PATENT DOCUMENTS

| | | | |
|---|---|---|---|
| 5,658,863 | A | 8/1997 | Duncan et al. |
| 5,705,459 | A | 1/1998 | Shiokawa et al. |
| 5,858,266 | A | 1/1999 | Kaneko |
| 6,261,472 | B1 | 7/2001 | Felix et al. |
| 6,783,691 | B1 | 8/2004 | Bivens et al. |
| 8,163,689 | B2 | 4/2012 | Singh et al. |
| 8,449,789 | B2 | 5/2013 | Kaneko et al. |
| 8,454,853 | B2 * | 6/2013 | Van Horn ............... C09K 5/044 252/68 |
| 9,303,900 | B2 * | 4/2016 | Van Horn ............... C09K 5/044 |
| 9,365,760 | B2 * | 6/2016 | Saito ..................... C10M 169/04 |
| 2003/0012420 | A1 | 1/2003 | Verwoerd et al. |
| 2004/0089839 | A1 | 5/2004 | Thomas et al. |
| 2006/0128576 | A1 | 6/2006 | Tazaki |
| 2008/0075673 | A1 | 3/2008 | Knopeck et al. |
| 2010/0038582 | A1 * | 2/2010 | Shimomura ........... C09K 5/044 252/67 |
| 2010/0038583 | A1 | 2/2010 | Shimomura et al. |
| 2010/0044619 | A1 | 2/2010 | Hulse et al. |
| 2010/0051854 | A1 * | 3/2010 | Sawada ................ C10M 105/38 252/68 |
| 2010/0122545 | A1 | 5/2010 | Minor et al. |
| 2010/0123095 | A1 | 5/2010 | Minor et al. |

(Continued)

FOREIGN PATENT DOCUMENTS

| | | |
|---|---|---|
| CN | 101945979 | 1/2011 |
| CN | 102191112 | 9/2011 |

(Continued)

OTHER PUBLICATIONS

Korean Office Action issued in Korean Patent Application No. 10-2018-7029460 dated Oct. 23, 2018.
International Search Report of Patent Application No. PCT/JP2013/058587 dated Jun. 25, 2013; with an English Translation thereof.
English Translation of the International Preliminary Report of Patentability for Application No. PCT/2013/058587, dated Oct. 9, 2014.
Extended European Search Report for EP Patent Application No. 13768669.7, dated Mar. 25, 2015.
Office Action for Chinese Patent Application No. 201380013051.1, dated Jun. 25, 2015.
Extended European Search Report for EP Patent Application No. 13768396.7, dated Mar. 19, 2015.

(Continued)

*Primary Examiner* — Joseph D Anthony
(74) *Attorney, Agent, or Firm* — Greenblum & Bernstein, P.L.C.

(57) ABSTRACT

The working fluid composition for a refrigerating machine of the present invention comprises a refrigerant comprising a first refrigerant component and a second refrigerant component, and having a global warming potential (GWP) of 500 or less, wherein the first refrigerant component is at least one selected from difluoromethane and tetrafluoropropene, and the second refrigerant component is at least one selected from carbon dioxide and a hydrocarbon having 3 to 4 carbon atoms; and a refrigerating machine oil comprising at least one selected from a polyol ester, a polyvinyl ether and a polyalkylene glycol compound as a base oil, wherein a carbon/oxygen molar ratio of the base oil is 2.5 or more and 5.8 or less.

6 Claims, No Drawings

(56) References Cited

U.S. PATENT DOCUMENTS

| | | | |
|---|---|---|---|
| 2010/0282999 A1 | 11/2010 | Shimomura et al. | |
| 2011/0012052 A1* | 1/2011 | Van Horn | C09K 5/044 252/68 |
| 2011/0057146 A1 | 3/2011 | Kaneko et al. | |
| 2011/0095224 A1 | 4/2011 | Rached | |
| 2011/0162410 A1 | 7/2011 | Low | |
| 2011/0258146 A1 | 10/2011 | Low | |
| 2011/0258147 A1 | 10/2011 | Low | |
| 2011/0260095 A1 | 10/2011 | Low | |
| 2012/0024007 A1* | 2/2012 | Ota | C09K 5/042 62/468 |
| 2012/0108482 A1* | 5/2012 | Greaves | C10M 107/34 508/579 |
| 2012/0132848 A1 | 5/2012 | Sawada et al. | |
| 2012/0298909 A1* | 11/2012 | Low | C08J 9/146 252/68 |
| 2013/0012419 A1 | 1/2013 | Matsumoto | |
| 2013/0012420 A1* | 1/2013 | Matsumoto | C09K 5/045 508/569 |
| 2013/0096218 A1 | 4/2013 | Rached | |
| 2014/0331697 A1 | 11/2014 | Minor et al. | |
| 2015/0028252 A1* | 1/2015 | Saito | C09K 5/045 252/68 |
| 2015/0041704 A1 | 2/2015 | Saito et al. | |
| 2015/0147012 A1* | 5/2015 | Scancarello | F25B 31/00 384/322 |
| 2016/0040094 A1* | 2/2016 | Kaneko | C10M 171/008 62/502 |
| 2017/0002291 A1* | 1/2017 | Takahashi | C10M 171/008 |

FOREIGN PATENT DOCUMENTS

| | | |
|---|---|---|
| CN | 102191113 | 9/2011 |
| CN | 102191114 | 9/2011 |
| CN | 102239228 | 11/2011 |
| EP | 1018538 | 7/2000 |
| EP | 2233553 | 9/2010 |
| EP | 2551333 | 1/2013 |
| EP | 2551334 | 1/2013 |
| EP | 2832836 | 2/2015 |
| JP | 06-145688 | 5/1994 |
| JP | H8-048990 | 2/1996 |
| JP | 08-151587 | 6/1996 |
| JP | 10-265771 | 10/1998 |
| JP | 2000-044937 | 2/2000 |
| JP | 2000-274360 | 10/2000 |
| JP | 2006-503961 | 2/2006 |
| JP | 2009-126979 | 6/2009 |
| JP | 2010-002074 | 1/2010 |
| JP | 2010-031728 | 2/2010 |
| JP | 2010-053252 | 3/2010 |
| JP | 2011-043276 | 3/2011 |
| JP | 2011-046885 | 3/2011 |
| JP | 2011085275 | 4/2011 |
| JP | 2011-162766 A | 8/2011 |
| JP | 2011-208068 | 10/2011 |
| JP | 2011-256361 | 12/2011 |
| JP | 2012-031239 | 2/2012 |
| KR | 1019980071797 | 10/1998 |
| KR | 1020000022202 | 4/2000 |
| KR | 1020090076950 | 7/2009 |
| KR | 1020090113817 | 11/2009 |
| KR | 1020090130053 | 12/2009 |
| KR | 1020100018546 | 2/2010 |
| KR | 1020100091225 | 8/2010 |
| KR | 1020100120145 | 11/2010 |
| KR | 1020100124806 | 11/2010 |
| KR | 1020110023764 | 3/2011 |
| WO | 2004/037913 | 5/2004 |
| WO | 2005/105947 | 11/2005 |
| WO | 2009/057475 | 5/2009 |
| WO | 2010/047116 | 4/2010 |
| WO | 2010/059677 | 5/2010 |
| WO | 2010/064005 | 6/2010 |
| WO | 2010/129920 | 11/2010 |
| WO | 2011/011656 | 1/2011 |
| WO | 2011/023923 | 3/2011 |
| WO | 2011/101622 | 8/2011 |
| WO | 2011/118732 | 9/2011 |
| WO | 2011/118733 | 9/2011 |
| WO | 2011/163117 | 12/2011 |

OTHER PUBLICATIONS

English translation of International Preliminary Report on Patentability for PCT/JP2013/059309, dated Oct. 9, 2014.
International Search Report of Patent Application No. PCT /JP2013/059309, dated Jun. 25, 2014; with an English Translation thereof.
Extended European Search Report for EP Patent Application No. 12843876.9, dated Mar. 30, 2015.
Office Action for Chinese Patent Application No. 201280052794.5, dated Dec. 3, 2014.
Korean Office Action issued with respect to counterpart Korean Application No. 10-2018-7018484, dated Jul. 12, 2018.
English translation of the International Preliminary Report of Patentability for PCT/JP2012/077642, dated May 8, 2014.
European Search Report issued with respect to application No. 13767593.0, dated Mar. 18, 2015.
English translation of the International Preliminary Report of Patentability for WO Patent Application No. PCT/JP2013/059316, dated Oct. 9, 2014.
International Search Report of Patent Application No. PCT /JP2013/059316, dated Jul. 2, 2013; with an English translation thereof.
Japanese Office Action issued with respect to application No. 2014-508042, dated Jan. 12, 2016.
Japanese Office Action issued with respect to application No. 2013-540830, dated Jan. 26, 2016.
English translation of the International Search Report for PCT/JP2012/077642, dated Dec. 25, 2012.
U.S. Office Action issued with respect to U.S. Appl. No. 14/353,616, dated Feb. 11, 2016.
Office Action issued with respect to U.S. Appl. No. 14/388,037, dated Mar. 17, 2016.
Office Action issued with respect to U.S. Appl. No. 14/387,298, dated Mar. 29, 2016.
U.S. Office Action issued in U.S. Appl. No. 14/353,616, dated Jun. 20, 2016.
Office Action issued in U.S. Appl. No. 14/388,037, dated Dec. 2, 2016.
Office Action issued in U.S. Appl. No. 14/387,298, dated Feb. 1, 2017.
Chinese Office Action in respect to Chinese Application No. 201380012190.2, dated Feb. 22, 2017.
Xie Quan, "Research and Application Guide of Lubricating Oil", Sinopec Press, 2007(2nd Edition), Feb. 2007, pp. 302-303, with English Translation.
Gao Hongliang, "Application and Calculation of Refrigeration Properties of Green Alternative Refrigerants", The Yellow River Water Conservancy Press, Aug. 2005, pp. 62, 68-73, with partial English Translation.
Office Action in China Patent Application No. 201511000959.6, dated Mar. 5, 2018.
Notice of Allowance in KR App. No. 10-2014-7027415 dated Mar. 28, 2018.
Notice of Allowance in KR App. No. 10-2014-7027434 dated Mar. 29, 2018.
Office Action in US Appl. No. 14/353,616 dated Apr. 6, 2018.
Office Action in China Patent Application No. 201511001457.5 dated Apr. 26, 2018.
Notice of Allowance issued in KR Patent Application No. 10-2018-7017947 dated Feb. 26, 2019.

* cited by examiner

WORKING FLUID COMPOSITION FOR REFRIGERATOR

The present application is a Divisional Application of U.S. application Ser. No. 14/387,079, filed on Sep. 22, 2014, which is a U.S. National Stage Application of International Patent Application No. PCT/JP2013/058587 filed Mar. 25, 2013, which claims priority to Japanese Application No. 2012-157976 filed on Jul. 13, 2012 and Japanese Application No. 2012-072310 filed on Mar. 27, 2012. The disclosures of U.S. application Ser. No. 14/387,079 and International Patent Application No. PCT/JP2013/058587 are incorporated by reference herein their entireties.

DESCRIPTION

Technical Field

The present invention relates to a working fluid composition for a refrigerating machine, and more specifically relates to a working fluid composition for a refrigerating machine which comprises a mixed refrigerant which contains components such as a hydrocarbon having 3 to 4 carbon atoms, difluoromethane (also referred to as "RFC-32" or "R32") and tetrafluoropropene, and has global warming potential (GWP) of 500 or less.

Background Art

CFC (chlorofluorocarbon) and HCFC (hydrochlorofluorocarbon), which have been conventionally used as refrigerants for refrigeration equipment, have been subject to regulation due to the problem of recent ozone depletion, and HFC (hydrofluorocarbon) has come to be used as a refrigerant instead of them.

Among HFC refrigerants, HFC-134a, R407C, and R410A are normally as refrigerants for car air-conditioners, cold storage chambers, or room air-conditioners. Although the ozone depletion potential (ODP) of these HFC refrigerant is zero, these come to be subject to regulation, because the global warming potential (GWP) thereof is high. While difluoromethane has been studied as one of alternate candidates of these refrigerants, difluoromethane has the following problems: the global warming potential thereof is not sufficiently low; the boiling point thereof is so low that thermodynamic characteristics cannot be applied to a current refrigeration system directly; and difluoromethane is not easily compatible with lubricating oils (refrigerating machine oils) used for conventional HFC refrigerants, such as polyol esters and polyvinyl ethers. On the other hand, unsaturated hydrofluorocarbon have been proposed to be used as a refrigerant due to the following reasons; both of its ODP and GWP are very low; unsaturated hydrofluorocarbons are non-flammable depending on structures; and in particular with respect to HFO-1234yf, thermodynamic characteristics as measures of refrigerant performances are comparable with or better than those of HFC-134a (Patent Literatures 1 to 3).

CITATION LIST

Patent Literature

[Patent Literature 1] International Publication WO2004/037913
[Patent Literature 2] International Publication WO2005/105947
[Patent Literature 3] International Publication WO2009/057475

SUMMARY OF INVENTION

Technical Problem

In the case where a refrigerant and a refrigerating machine oil are applied to a refrigeration system, it is demanded for the refrigerant that the refrigerant does not have any adverse influences on the environment and that thermodynamics characteristics are adapted to the refrigeration system. In addition, in a circumstance of coexistence of the refrigerant and the refrigerating machine oil it is demanded that they are soluble in each other (compatibility) and are excellent in thermal/chemical stability, and that an oil film is maintained in order to suppress wear of a sliding member (lubricity).

With respect to a refrigeration system using unsaturated hydrofluorocarbons, it has been considered that since refrigerating machine oils used in HFC, such as polyol esters and polyvinyl ethers, exhibit compatibility with unsaturated hydrofluorocarbons, these refrigerating machine oil can be applied. According to the studies by the present inventors, however, the following problem has been revealed: unsaturated hydrofluorocarbons have unstable double bonds in their molecules and thus are poor in thermal/chemical stability.

In addition, one reason why the compatibility between the refrigerant and the refrigerating machine oil (hereinafter, sometimes simply referred to as "compatibility".) is demanded is because a refrigerating machine oil for lubricating a refrigerant compressor circulates together with a refrigerant in the refrigerant circulation cycle of refrigeration equipment. That is, in the refrigeration equipment, sufficient compatibility between the refrigerant and the refrigerating machine oil is not achieved depending on the selection of the refrigerating machine oil used to the refrigerant, and the refrigerating machine oil discharged from the refrigerant compressor easily remains in the cycle. As a result, there occur problems of wear due to lubrication failure by the reduction in amount of the oil in the refrigerant compressor and of blockage of an expansion mechanism such as a capillary. Therefore, it is important to select the refrigerating machine oil adapted to the refrigerant. In a refrigeration system using difluoromethane, however, a problem is that difluoromethane is not easily compatible with the refrigerating machine oil, and there is also the problem of thermodynamics characteristics.

The present invention has been made in view of such problems, and an object thereof is to provide a working fluid composition for a refrigerating machine which can achieve compatibility and thermal/chemical stability in a refrigeration system using a refrigerant such as a hydrocarbon, difluoromethane, and an unsaturated hydrofluorocarbon without requiring for a significant modification of an existing system.

Solution to Problem

The present inventors have made intensive studies in order to solve the above object, and as a result, have found that a specific refrigerant, and a refrigerating machine oil containing a specific ester or ether as a base oil can be used to allow both of sufficiently high compatibility and thermal/chemical stability to be achieved at high levels, leading to the completion of the present invention.

That is, the present invention provides a working fluid composition for a refrigerating machine, shown in any of the following [1] to [9].

[1] A working fluid composition for a refrigerating machine, comprising:

a refrigerant comprising a first refrigerant component and a second refrigerant component, and having a global warming potential GWP) of 500 or less, wherein the first refrigerant component is at least one selected from difluoromethane and tetrafluoropropene, and the second refrigerant component is at least one selected from carbon dioxide and a hydrocarbon having 3 to 4 carbon atoms; and a refrigerating machine oil comprising at least one selected from a polyol ester, a polyvinyl ether and a polyalkylene glycol compound as a base oil, wherein a carbon/oxygen molar ratio of the base oil is 2.5 or more and 5.8 or less.

[2] The working fluid composition for a refrigerating machine according to [1], wherein the refrigerant comprises the hydrocarbon having 3 to 4 carbon atoms, difluoromethane and tetrafluoropropene, and has a global warming potential of 400 or less.

[3] The working fluid composition for a refrigerating machine according to [1] or [2], wherein the refrigerant contains 3 to 40 parts by mass of the hydrocarbon having 3 to 4 carbon atoms, 20 to 60 parts by mass of difluoromethane and 20 to 70 parts by mass of tetrafluoropropene based on 100 parts by mass of the refrigerant.

[4] The working fluid composition for a refrigerating machine according to any one of [1] to [3], wherein the hydrocarbon having 3 to 4 carbon atoms is propane or isobutane, and a global warming potential of the refrigerant is 300 or less.

[5] The working fluid composition for a refrigerating machine according to [1], wherein the refrigerant comprises at least one selected from difluoromethane and tetrafluoropropene, and carbon dioxide, and has a global warming potential of 500 or less.

[6] The working fluid composition for a refrigerating machine according to any one of [1] to [5], wherein a mass ratio of the refrigerant to the refrigerating machine oil is 90:10 to 30:70.

[7] The working fluid composition for a refrigerating machine according to any one of [1] to [6], wherein the base oil comprises a polyol ester having a carbon/oxygen molar ratio of 2.5 or more and 5.8 or less, and the polyol ester is a polyol ester obtainable by synthesis from a fatty acid having 4 to 9 carbon atoms and a polyhydric alcohol having 4 to 12 carbon atoms.

[8] The working fluid composition for a refrigerating machine according to any one of [1] to [6], wherein the base oil contains a polyalkylene glycol compound having a carbon/oxygen molar ratio of 2.5 or more and 5.8 or less, and the polyalkylene glycol compound is a compound having a homopolymerization chain of propylene oxide or a copolymerization chain of propylene oxide and ethylene oxide, at least one of both ends of the chain being blocked by an ether bond.

[9] The working fluid composition for a refrigerating machine according to any one of [1] to [6], wherein the base oil comprises a polyvinyl ether having a carbon/oxygen molar ratio of 2.5 or more and 5.8 or less, and the polyvinyl ether is a polyvinyl ether having a structural unit represented by the following formula (1).

[Chemical Formula 1]

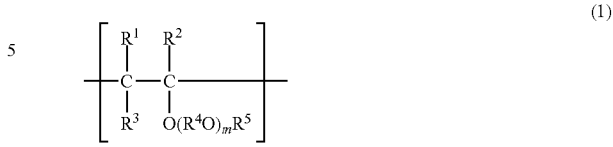

(1)

[$R^1$, $R^2$ and $R^3$ may be the same or different and each represent a hydrogen atom or a hydrocarbon group having 1 to 8 carbon atoms, $R^4$ represents a divalent hydrocarbon group having 1 to 10 carbon atoms or an ether bond oxygen-containing divalent hydrocarbon group having 2 to 20 carbon atoms, $R^5$ represents a hydrocarbon group having 1 to 20 carbon atoms, m represents a number such that an average value of m the polyvinyl ether is 0 to 10, $R^1$ to $R^5$ may be the same or different in each occurrence of the structural units, and when in represents 2 or more in one structural unit, a plurality of $R^4O$ may be the same or different.]

Advantageous Effects of Invention

The present invention can provide a working fluid composition for a refrigerating machine which can achieve compatibility and thermal/chemical stability in a refrigeration system using a refrigerant such as a hydrocarbon, difluoromethane, and an unsaturated hydrofluorocarbon without requiring for a significant modification of an existing system.

DESCRIPTION OF EMBODIMENTS

Hereinafter, a preferable embodiment of the present invention is described in detail.

A working fluid composition for a refrigerating machine according to an embodiment of the present invention comprises a refrigerant comprising a first refrigerant component and a second refrigerant component, wherein the first refrigerant component is at least one selected from difluoromethane and tetrafluoropropene, and the second refrigerant component is at least one selected from carbon dioxide and a hydrocarbon having 3 to 4 carbon atoms, and having a global warming potential (GWP) of 500 or less, and a refrigerating machine oil comprising at least one selected from a polyol ester, a polyvinyl ether and a polyalkylene glycol compound as a base oil, wherein a carbon/oxygen molar ratio of the base oil is 2.5 or more and 5.8 or less.

In the working fluid composition for a refrigerating machine according to the present embodiment, the proportions of the refrigerant and the refrigerating machine oil blended are not particularly limited, but the mass ratio of the refrigerant to the refrigerating machine oil is preferably 90:10 to 30:70 and more preferably 80:20 to 40:60.

Then, the components contained in the working fluid for a refrigerating machine are described in detail.

[Refrigerant]

The refrigerant in the present embodiment contains a first refrigerant component that is at least one selected from difluoromethane and tetrafluoropropene, and a second refrigerant component that is at least one selected from carbon dioxide and a hydrocarbon having 3 to 4 carbon atoms, and the global warming potential thereof is 500 or less.

Herein, since difluoromethane (R32) has a low boiling point and a high pressure by itself, thermodynamic characteristics thereof as the refrigerant cannot be said to be suitable. In addition, the global warming potential thereof, namely, the GWP value is about 600 and is lower than that of HFC-134a that is a typical hydrofluorocarbon, 1300, but cannot be said to be sufficiently low. In addition, difluoromethane (R32) is not easily compatible with the refrigerating machine oil. Difluoromethane (R32), however, is good in stability even if coexisting with the refrigerating machine oil.

In addition, thermodynamic characteristics of tetrafluoropropene such as 2,3,3,3-tetrafluoropropene (HFO-1234yf) are almost comparable with those of HFC-134a. Furthermore, for example, the GWP value of HFO-1234yf is 4 and is extremely low as compared with that of HFC-134a. The reason for this is because tetrafluoropropene has a double bond in its molecule and thus is easily decomposed in the atmosphere. In addition, tetrafluoropropene such as 2,3,3,3-tetrafluoropropene has proper compatibility with the refrigerating machine oil. Tetrafluoropropene, however, is easily decomposed and thus has the problem of being poor in stability.

In addition, while the hydrocarbon having 3 to 4 carbon atoms has a low global warming potential (GWP) of about 3 and is good in thermodynamics characteristics as the refrigerant, it has a problem of safety due to its highly flammability, and is so high in solubility in the refrigerating machine oil that the viscosity of the oil is reduced to thereby cause a problem of a significant reduction in lubricity. Thus, it is difficult to singly use the hydrocarbon having 3 to 4 carbon atoms, except for a special case.

Then, in the present embodiment, a first refrigerant component that is at least one selected from difluoromethane and tetrafluoropropene, and a second refrigerant component that is at least one selected from carbon dioxide and a hydrocarbon having 3 to 4 carbon atoms are mixed, and the resulting mixed refrigerant can be used as a suitable refrigerant, in which disadvantages of each refrigerants are compensated and advantages thereof are utilized.

The first refrigerant component may include only any one of difluoromethane and tetrafluoropropene, or may include both of difluoromethane and tetrafluoropropene.

Tetrafluoropropenes include 2,3,3,3-tetrafluoropropene (HFO-1234yf:), 1,3,3,3-tetrafluoropropene (HFO-1234ze), and 1,2,3,3-tetrafluoropropene (HFO-1234ye). Among them, HFO-1234yf and HFO-1234ze are preferable, and in particular HFO-1234yf is preferable in terms of physical properties of the refrigerant. Tetrafluoropropenes may be used singly or in combination of two or more thereof.

The second refrigerant component may include only any one of carbon dioxide and a hydrocarbon having 3 to 4 carbon atoms, or may include both of carbon dioxide and a hydrocarbon having 3 to 4 carbon atoms.

Hydrocarbons having 3 to 4 carbon atoms include propane (R290), propylene (R1270), n-butane (R600), and isobutane (R600a), and the GWP of all of them is as extremely low as about 3, as described above. Among them, propane and isobutane are preferable in terms of thermodynamics characteristics and stability.

While the refrigerant in the present embodiment can further contain a component other than the first and second components, the sum of the first refrigerant component and the second refrigerant component is preferably 80% by mass or more and more preferably 90% by mass or more based on the total amount of the refrigerant.

The component other than the first and second components includes a hydrofluorocarbon (HFC) refrigerant and fluorine-containing ether-based refrigerants such as perfluoroethers.

In addition, the refrigerant in the present embodiment can further contain unsaturated hydrofluorocarbons other than tetrafluoropropenes. As such unsaturated hydrofluorocarbons, fluoropropenes containing 3 or more and 5 or less fluorine atoms are preferable, and any one of 1,2,3,3,3-pentafluoropropene (HFO-1225ye) and 3,3,3-trifluoropropene (HFO-1243zf) or a mixture of two or more of thereof is preferable. From the viewpoint of physical properties of the refrigerant, HFO-1225ye is preferable.

Preferable examples of the refrigerant in the present embodiment include mixed refrigerants A and B described later.

[Mixed Refrigerant A]

The mixed refrigerant A in the present embodiment contains a hydrocarbon having 3 to 4 carbon atoms, difluoromethane and tetrafluoropropene, and the global warming potential thereof is 400 or less.

With respect to the mixed refrigerant A, hydrocarbons having 3 to 4 carbon atoms include propane (R290), propylene (R1270), n-butane (R600) and isobutane (R600a), and the GWP thereof is as extremely low as about 3, as described above. Among them, propane and isobutane are preferable in terms of thermodynamics characteristics and stability. Hydrocarbons having 3 to 4 carbon atoms may be used singly or in combination of two or more.

With respect to the mixed refrigerant A, tetrafluoropropenes include 2,3,3,3-tetrafluoropropene (HFO-1234yf), 1,3,3,3-tetrafluoropropene (HFO-1234ze) and 1,3,3,3-tetrafluoropropene (HFO-1234ye). Among them, HFO-1234yf and HFO-1234ze are preferable, and in particular HFO-1234yf is preferable in terms of physical properties of the refrigerant. Tetrafluoropropenes may be used singly or in combination of two or more thereof.

The content of each of the refrigerants in the mixed refrigerant A cased on 100 parts by mass of the mixed refrigerant is preferably as follows: the content of the hydrocarbon having 3 to 4 carbon atoms is 3 to 40 parts by mass, the content of difluoromethane is 20 to 60 parts by mass, and the content of tetrafluoropropene is 20 to 70 parts by mass; and more preferably as follows: the content of the hydrocarbon having 3 to 4 carbon atoms is 5 to 30 parts by mass, the content of difluoromethane is 20 to 60 parts by mass, and the content of tetrafluoropropene is 30 to 70 parts by mass. Herein, difluoromethane is a high-pressure gas, and therefore when the content thereof is high, the efficiency of the refrigerating machine is increased. But when the content thereof is high, the GWP is increased, and also the compatibility between the refrigerant and the refrigerating machine oil is deteriorated. On the other hand, tetrafluoropropene, whose GWP is low, contributes environmental-friendliness when the content thereof is high. But it is poor in stability and thus the stability of the working fluid is deteriorated when the content thereof is high.

The global warming potential of the mixed refrigerant A is 400 or less, preferably 300 or less, and more preferably 150 or less. Herein, the global warming potential can also be reduced by mixing only difluoromethane and tetrafluoropropene without using the hydrocarbon having 3 to 4 carbon atoms, but in such a case, the content of tetrafluoropropene whose pressure is low is high. As a result, the efficiency of the refrigerating machine cannot be increased and the stability is also poor.

While the mixed refrigerant A can further contain a component other than the above three components, the sum of the hydrocarbon having 3 to 4 carbon atoms, difluoromethane and tetrafluoropropene is preferably 80% by mass or more and more preferably 90% by mass or more based on the total amount of the refrigerant.

[Mixed Refrigerant B]

A mixed refrigerant B in the present embodiment contains at least one selected from difluoromethane and tetrafluoropropene, and carbon dioxide, and the global warming potential thereof is 500 or less.

With respect to the mixed refrigerant B, tetrafluoropropenes include 2,3,3,3-tetrafluoropropene (HFO-1234yf), 1,3,3,3-tetrafluoropropene (HFO-1234ze) and 1,2,3,3-tetrafluoropropene (HFO-1234ye). Among them, HFO-1234yf and HFO-1234ze are preferable, and in particular HFO-1234yf is preferable in terms of physical properties of the refrigerant. Tetrafluoropropenes may be used singly or in combination of two or more thereof.

The content of each of refrigerants in the mixed refrigerant B based on 100 parts by mass of the mixed refrigerant is preferably as follows: the content of difluoromethane and/or tetrafluoropropene is 30 to 90 parts by mass, and the content of carbon dioxide is 10 to 70 parts by mass; and more preferably as follows: the content of difluoromethane and/or tetrafluoropropene is 40 to 80 parts by mass, and the content of carbon dioxide is 20 to 60 parts by mass. Herein, difluoromethane is a high-pressure gas, and therefore when the content thereof is high, the efficiency of the refrigerating machine is increased. But when the content thereof is high, the GWP is increased, and also the compatibility between the refrigerant and the refrigerating machine oil is deteriorated. On the other hand, tetrafluoropropene, whose GWP is low, contributes environmental-friendliness when the content thereof is high. But it is poor in stability and thus the stability of the working fluid is deteriorated when the content thereof is high.

In addition, in the case where the mixed refrigerant B contains all of difluoromethane, tetrafluoropropene and carbon dioxide, the proportions of difluoromethane and tetrafluoropropene contained are not particularly limited, but it is preferable from the viewpoints of GWP and thermodynamic characteristics that difluoromethane/tetrafluoropropene ratio (mass ratio) be in a range from 30/70 to 70/30.

The global warming potential of the mixed refrigerant B is 500 or less, preferably 300 or less, and more preferably 150 or less, from the viewpoint of the global environment protection.

While the refrigerant in the present embodiment can further contain a component other than the above three components, the sum of difluoromethane and/or tetrafluoropropene, and carbon dioxide is preferably 80% by mass or more and more preferably 90% by mass or more based on the total amount of the refrigerant.

[Refrigerating Machine Oil]

The refrigerating machine oil in the present embodiment contains at least one selected from a polyol ester, a polyvinyl ether and a polyalkylene glycol compound as a base oil, and the carbon/oxygen molar ratio of the base oil is 2.5 or more and 5.8 or less. Carbon and oxygen in the base oil can be quantitatively analyzed by a common elemental analysis method. While a carbon analysis includes a thermal conductivity method after conversion into carbon dioxide by burning, and a gas chromatography method, an oxygen analysis is commonly a carbon reduction method in which carbon monoxide derived by carbon is quantitatively analyzed, and a Shutze-Unterzaucher method is widely put into practical use.

In the case where the base oil is a mixed base oil including two or more components, the carbon/oxygen molar ratio of each of the components included in the mixed base oil is not particularly limited as long as the carbon/oxygen molar ratio of the mixed base oil is 2.5 or more and 5.8 or less, but it is preferable that the carbon/oxygen molar ratio of each of the polyol ester, the polyvinyl ether and the polyalkylene glycol compound is 2.5 or more and 5.8 or less. These preferable examples are described later.

[Polyol Ester]

The polyol ester is an ester obtainable by synthesis from a polyhydric alcohol and a carboxylic acid, and the carbon/oxygen molar ratio is preferably 2.5 or more and 5.8 or less, more preferably 3.2 or more and 5.0 or less, and further preferably 4.0 or more and 5.0 or less. As the carboxylic acid, fatty acids (aliphatic monocarboxylic acids), in particular saturated fatty acids are preferably used, and the number of carbon atoms thereof is preferably 4 or more and 9 or less and particularly preferably 5 or more and 9 or less. The polyol ester may be a partial ester in which some of hydroxyl groups in the polyhydric alcohol remains as hydroxyl groups without being esterified, may be a complete ester in which all of hydroxyl groups are esterified, or may be a mixture of the partial ester and the complete ester; but the hydroxyl value is preferably 10 mgKOH/g or less, further preferably 5 mgKOH/g or less, and most preferably 3 mgKOH/g or less.

[Fatty Acid]

(a-1) In the mixed refrigerant A, in the case where the proportion of difluoromethane that is poor in compatibility with the refrigerating machine oil is high among main components of the refrigerant, i.e., the hydrocarbon having 3 to 4 carbon atoms, difluoromethane and tetrafluoropropene, for example, in the case where the proportion of difluoromethane in the refrigerant is 40% by mass or more, the proportion of branched fatty acids of fatty acids forming the polyol ester is preferably 50 to 100% by mol, particularly preferably 70 to 100% by mol, and further preferably 90 to 100% by mol.

(a-2) In the mixed refrigerant B, in the case where the proportion of difluoromethane that is poor in compatibility with the refrigerating machine oil is 40% by mass or more among main components of the refrigerant, i.e., difluoromethane and/or tetrafluoropropene, and carbon dioxide, the proportion of branched fatty acids of fatty acids forming the polyol ester is preferably 50 to 100% by mol, particularly preferably 70 to 100% by mol, and further preferably 90 to 100% by mol.

Specific examples of branched fatty acids having 4 to 9 carbon atoms include branched butanoic acids, branched pentanoic acids, branched hexanoic acids, branched heptanoic acids, branched octanoic acids, and branched nonanoic acids. More specifically, fatty acids branched at α-position and/or β-position are preferable, isobutanoic acid, 2-methylbutanoic acid, 2-methylpentanoic acid, 2-inethylhexanoic acid, 2-ethylpentanoic acid, 2-methylheptanoic acid, 2-ethylhexanoic acid, 3,5,5-trimethylhexanoic acid, and the like are preferable, and among them, 2-ethylhexanoic acid and/or 3,5,5-trimethylhexanoic acid is most preferable. Herein, fatty acids other than branched fatty acids having 4 to 9 carbon atoms may be included.

(b-1) in the mixed refrigerant A, in the case where the total of the contents of the hydrocarbon having 3 to 4 carbon atoms and tetrafluoropropene among main components of the refrigerant is higher than the content of difluoromethane, specifically, the total content of both the components is 60% by mass or more, in particular, 70% by mass or more, the proportion of straight fatty acids of fatty acids is preferably 50 to 95% by mol, particularly preferably 60 to 90% by mol, and further preferably 70 to 85% by mol in view of high compatibility with the refrigerating machine oil.

(b-2) in the mixed refrigerant B, in the case where the proportion of difluoromethane among main components of the refrigerant is less than 40% by mass, the proportion of straight fatty acids of fatty acids is preferably 50 to 95% by mol, particularly preferably 60 to 90% by mol, and further preferably 70 to 85% by mol in view of high compatibility with the refrigerating machine oil.

Specific examples of straight fatty acids having 4 to 9 carbon atoms include butanoic acid, pentanoic acid, hexanoic acid, heptanoic acid, octanoic acid, and nonanoic acid. Among them, pentanoic acid and/or heptanoic acid is preferable, and in particular a mixed acid thereof is most preferable. The content of straight pentanoic acid is preferably 30% by mol or more in particular in terms of compatibility, and on the other hand, is preferably 50% by mol or less and particularly preferably 45% by mol or less in particular in terms of hydrolytic stability. The content of heptanoic acid is preferably 20% by mol or more, particularly preferably 25% by mol or more, and further preferably 30% by mol or more, in terms of lubricity. On the other hand, the content is 50% by mol or less and preferably 45% by mol or less in particular in terms of hydrolytic stability. As branched fatty acids other than straight fatty acids, branched fatty acids having 5 to 9 carbon atoms, in particular, 2-ethylhexanoic acid and/or 3,5,5-trimethylhexanoic acid is preferable. The content of 3,5,5-trimethylhexanoic acid is preferably 5% by mol or more and particularly preferably 10%© by mol or more in particular in terms of hydrolytic stability, and on the other hand, the content is preferably 30% by mol or less and particularly preferably 25% by mol or less in particular in terms of compatibility and lubricity.

As preferable fatty acids in the cases (b-1) and (b-2), specifically, a mixed acid of straight pentanoic acid, straight heptanoic acid and 3,5,5-trimethylhexanoic acid is preferable, and this mixed acid is more preferably one containing 30 to 50% by mol of straight pentanoic acid, 20 to 50% by mol of straight heptanoic acid and 5 to 30% by mol of 3,5,5-trimethylhexanoic acid.

[Polyhydric Alcohol]

As the polyhydric alcohol forming the polyol ester, polyhydric alcohols having 2 to 6 hydroxyl groups are preferably used. The number of carbon atoms of polyhydric alcohols is preferably 4 to 12 and particularly preferably 5 to 10. Hindered alcohols such as neopentyl glycol, trimethylolethane, trimethylolpropane, trimethylolbutane, di-(trimethylolpropane), tri-(trimethylolpropane), pentaerythritol and di-(pentaerythritol) are preferable. Since being particularly excellent in compatibility with the refrigerant and in hydrolytic stability, pentaerythritol or a mixed ester of pentaerythritol and di-(pentaerythritol) is most preferable.

[Polyvinyl Ether]

The carbon/oxygen molar ratio of the polyvinyl ether is preferably 2.5 or more and 5.8 or less, more preferably 3.2 or more and 5.8 or less, and further preferably 4.0 or more and 5.0 or less. If the carbon/oxygen molar ratio is less than this range, hygroscopicity is higher, and if the ratio is more than this range, compatibility is deteriorated. In addition, the weight average molecular weight of the polyvinyl ether is preferably 200 or more and 3000 or less and more preferably 500 or more and 1500 or less.

The polyvinyl ether preferably used in the present embodiment has a structural unit represented by the following formula (1).

[Chemical Formula 2]

[$R^1$, $R^2$ and $R^3$ may be the same or different and each represent a hydrogen atom or a hydrocarbon group having 1 to 8 carbon atoms, $R^4$ represents a divalent hydrocarbon group having 1 to 10 carbon atoms or an ether bond oxygen-containing divalent hydrocarbon group having 2 to 20 carbon atoms, $R^5$ represents a hydrocarbon group having 1 to 20 carbon atoms, m represents a number such that an average value of in in the polyvinyl ether is 0 to 10, $R^1$ to $R^5$ may be the same or different in each occurrence of the structural units, and when m represents 2 or more in one structural unit, a plurally of $R^4O$ may be the same or different.]

At least one of $R^1$, $R^2$ and $R^3$ in the above formula (1) is preferably a hydrogen atom, and all thereof are particularly preferably a hydrogen atom. m in the formula (1) is preferably 0 or more and 10 or less, particularly preferably 0 or more and 5 or less, and further preferably 0. $R^5$ in the formula (1) represents a hydrocarbon group having 1 to 20 carbon atoms. This hydrocarbon group includes an alkyl group, a cycloalkyl group, a phenyl group, an aryl group, an arylalkyl group, and an alkyl group, and in particular an alkyl group having 1 to 5 carbon atoms is preferable.

The polyvinyl ether in the present embodiment may be a homopolymer constituted by one type of the structural unit represented by the formula (1) or a copolymer constituted by 2 or more type of the structural units, but the copolymer brings about the effect of further enhancing lubricity, insulation property, hygroscopicity, and the like while satisfying compatibility. In this case, the types of monomers serving as raw materials, the type of an initiator, and the rate of a copolymer can be selected to thereby adapt the performances of an oil agent to the intended levels. Accordingly, the following effect is exerted: an oil agent can be obtained at will according to requirements such as lubricity and compatibility that vary depending on the type of a compressor in a refrigeration system or an air-conditioning system, the material of a lubrication portion, refrigeration ability, the type of a refrigerant, and the like. The copolymer may be any of a block copolymer and a random copolymer.

In the case where the polyvinyl ether in the present embodiment is a copolymer, it is preferable that the copolymer include a structural unit (1-1) represented by the above formula (1) wherein $R^5$ represents an alkyl group having 1 to 3 carbon atoms, and a structural unit (1-2) represented by the above formula (1) wherein $R^5$ represents an alkyl group having 3 to 20 carbon atoms, preferably 3 to 10 carbon atoms, further preferably 3 to 8 carbon atoms. $R^5$ in the structural unit (1-1) is particularly preferably an ethyl group, and $R^5$ in the structural unit (1-2) is particularly preferably an isobutyl group. Furthermore, in the case where the polyvinyl ether in the present embodiment is the copolymer including the structural units (1-1) and (1-2), the molar ratio of the structural unit (1-1) to the structural unit (1-2) is preferably 5:95 to 95:5, more preferably 20:80 to 90:10, and further preferably 70:30 to 90:10. In the case where the molar ratio departs from the above range, there is a tendency toward insufficient compatibility with the refrigerant and higher hygroscopicity.

The polyvinyl ether in the present embodiment may be one constituted by only the structural unit represented by the above formula (1), but may be a copolymer further including a structural unit represented by the following formula (2). In this case, the copolymer may be any of a block copolymer and a random copolymer.

[Chemical Formula 3]

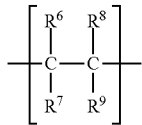

(2)

[$R^6$ to $R^9$ may be the same as or different from one another and each represent a hydrogen atom or a hydrocarbon group having 1 to 20 carbon atoms.]

[End Structure of Polyvinyl Ether]

The polyvinyl ether in the present embodiment can be produced by polymerization of each corresponding vinyl ether-based monomer, and copolymerization of a corresponding hydrocarbon monomer having an olefinic double bond with a corresponding vinyl ether-based monomer. As the vinyl ether-based monomer corresponding to the structural unit represented by the formula (1), a monomer represented by the following formula (3) is suitable.

[Chemical Formula 4]

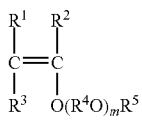

(3)

[$R^1$, $R^2$, $R^3$, $R^4$, $R^5$ and in represent the same meaning as in $R^1$, $R^2$, $R^3$, $R^4$, $R^5$ and m in the formula (1), respectively.]

As the polyvinyl ether in the present embodiment, ethers having the following end structures are suitable.
(A) Those having a structure in which one end is represented by formula (4) or (5) and other end is represented by formula (6) or (7).

[Chemical Formula 5]

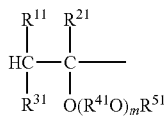

(4)

[$R^{11}$, $R^{21}$ and $R^{31}$ may be the same as or different from one another and each represent a hydrogen atom or a hydrocarbon group having 1 to 8 carbon atoms, $R^{41}$ represents a divalent hydrocarbon group having 1 to 10 carbon atoms or an ether bond oxygen-containing divalent hydrocarbon group having 2 to 20 carbon atoms, $R^{51}$ represents a hydrocarbon group having 1 to 20 carbon atoms, m represents a number such that an average value of m in the polyvinyl ether is 0 to 10, and when m represents 2 or more, a plurality of $R^{41}O$ may be the same or different.]

[Chemical Formula 6]

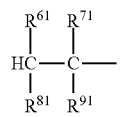

(5)

[$R^{61}$, $R^{71}$, $R^{81}$ and $R^{91}$ may be the same as or different from one another and each represent a hydrogen atom or a hydrocarbon group having 1 to 20 carbon atoms.]

[Chemical Formula 7]

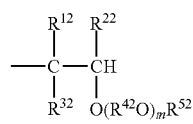

(6)

[$R^{12}$, $R^{22}$ and $R^{32}$ may be the same as or different from one another and each represent a hydrogen atom or a hydrocarbon group having 1 to 8 carbon atoms, $R^{42}$ represents a divalent hydrocarbon group having 1 to 10 carbon atoms or an ether bond oxygen-containing divalent hydrocarbon group having 2 to 20 carbon atoms, $R^{52}$ represents a hydrocarbon group having 1 to 20 carbon atoms, m represents a number such that an average value of in in the polyvinyl ether is 0 to 10, and when in represents 2 or more, a plurality of $R^{42}O$ may be the same or different.]

[Chemical Formula 8]

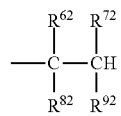

(7)

[$R^{62}$, $R^{72}$, $R^{82}$ and $R^{92}$ may be the same as or different from one another and each represent a hydrogen atom or a hydrocarbon group having 1 to 20 carbon atoms.

(B) Those having a structure in which one end is represented by the above formula (4) or (5) and other end is represented by the following formula (8).

[Chemical Formula 9]

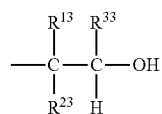

(8)

[$R^{13}$, $R^{23}$ and $R^{33}$ may be the same as or different from one another and each represent a hydrogen atom or a hydrocarbon group having 1 to 8 carbon atoms.]

Among such polyvinyl ether-based compounds, in particular the following is suitable as a main component of the refrigerating machine oil according to the present embodiment.

(1) Those having a structure in which one end is represented by the formula (5) or (6) and other end is represented by the formula (7) or (8), wherein in the formula (1), $R^1$, $R^2$ and $R^3$ are each a hydrogen atom, m represents a number of 0 to 4, $R^4$ represents a divalent hydrocarbon group having 2 to 4 carbon atoms, and $R^5$ represents a hydrocarbon group having 1 to 20 carbon atoms.

(2) Those having only the structural unit represented by the formula (1), having a structure in which one end is represented by the ion (5) and other end is represented by the formula (7), wherein in the formula. (1), $R^1$, $R^2$ and $R^3$ are each a hydrogen atom, m represents a number of 0 to 4, $R^4$ represents a divalent hydrocarbon group having 2 to 4 carbon atoms, and $R^5$ represents a hydrocarbon group having 1 to 20 carbon atoms.

(3) Those having a structure in which one end is represented by the formula (5) or (6) and other end is represented by the formula (9), wherein in the formula (1), $R^1$, $R^2$ and $R^3$ are each a hydrogen atom, m represents a number of 0 to 4, $R^4$ represents a divalent hydrocarbon group having 2 to 4 carbon atoms, and $R^5$ represents a hydrocarbon group having 1 to 20 carbon atoms.

(4) Those that are each of the (1) to (3), having a structural unit in which $R^5$ in the formula (1) represents a hydrocarbon group having 1 to 3 carbon atoms, and a structural unit in which such $R^5$ represents a hydrocarbon group having 3 to 20 carbon atoms.

[Production of Polyvinyl Ether]

The polyvinyl ether in the present embodiment can be produced by subjecting the above monomer to radical polymerization, cation polymerization, radiation polymerization, or the like. After completion of the polymerization reaction, a usual separation/purification method is if necessary conducted, and thus the intended polyvinyl ether-based compound having the structural unit represented by the formula (1) is obtained.

As described above, it is required for the polyvinyl ether in the present embodiment that the carbon/oxygen molar ratio is in the predetermined range, and the carbon/oxygen molar ratio of a raw material monomer can be regulated to thereby produce a polymer whose molar ratio is in the above range. That is, when the rate of a monomer whose carbon/oxygen molar ratio is high is high, a polymer whose carbon/oxygen molar ratio is high is obtained, and when the rate of a monomer whose carbon/oxygen molar ratio is low is high, a polymer whose carbon/oxygen molar ratio is low is obtained. Herein, in the case where a vinyl ether-based monomer and a hydrocarbon monomer having an olefinic double bond are copolymerized, a polymer whose carbon/oxygen molar ratio is higher than the carbon/oxygen molar ratio of the vinyl ether-based monomer is obtained, but the proportion thereof can be regulated by the rate and the number of carbon atoms of the hydrocarbon monomer having an olefinic double bond to be used.

In addition, in a production step of the polyvinyl ether represented by the above formula (1), a side reaction may be caused and thus an unsaturated group such as an aryl group may be formed in the molecule. If the unsaturated group is formed in the polyvinyl ether molecule, the following phenomenon easily occurs: the thermal stability of the polyvinyl ether itself is deteriorated, a polymerized produce is generated to generate sludge, or antioxidative property (oxidation preventing property) is deteriorated to generate peroxide. In particular, if peroxide is generated, it is decomposed to generate a compound having a carbonyl group, and the compound having a carbonyl group further generates sludge to easily cause blockage of a capillary. Therefore, as the polyvinyl ether according to the present embodiment, those in which the degree of unsaturation due to an unsaturated group and the like is low is preferable, and specifically, the degree of unsaturation is preferably 0.04 meq/g or less, more preferably 0.0.3 meq/g or less, and most preferably 0.02 meq/g or less. In addition, the peroxide value is preferably 10.0 meq/kg or less, more preferably 5.0 meq/kg or less, and most preferably 1.0 meq/kg. Furthermore, the carbonyl value is preferably 100 ppm by weight or less, more preferably 50 ppm by weight or less, and most preferably 20 ppm by weight or less.

Herein, the degree of unsaturation, the peroxide value and the carbonyl value in the present invention are each the value measured by the Standard Methods for the Analysis of Fats, Oils and Related Materials, established by the Japan Oil Chemists' Society. That is, the degree of unsaturation in the present invention is the value (meq/g) obtained by reacting a Wijs solution (ICI-acetic acid solution) with a sample, leaving the resultant to stand in a dark area, thereafter reducing the excess ICI to iodine, titrating the iodine content with sodium thiosulfate to calculate the iodine value, and converting the iodine value to the vinyl equivalent; the peroxide value in the present invention is the value (meq/kg) obtained by adding potassium iodide to a sample, titrating the free iodine generated with sodium thiosulfate, and converting the free iodine to the number of milliequivalents with respect to 1 kg of the sample; and the carbonyl value in the present invention is the value (ppm by weight) obtained by allowing 2,4-dinitrophenylhydrazine to act on a sample to yield a colorable quinoid ion, measuring the absorbance of the sample at 480 nm, and converting the absorbance to the carbonyl content based on a predetermined calibration curve with cinnamaldehyde as the standard substance. The hydroxyl value is not particularly limited, but it is desirable that the hydroxyl value be 10 mgKOH/g, preferably 5 mgKOH/g and further preferably 3 mgKOH/g.

[Polyalkylene Glycol Compound]

The carbon/oxygen molar ratio of the polyalkylene glycol (PAG) compound in the present embodiment is preferably 2.5 or more and 5.8 or less, preferably 2.5 or more and 4.0 or less, and further preferably 2.7 or more and 3.5 or less. If the molar ratio is less than this range, hygroscopicity is high and electrical insulation property is deteriorated, and if the molar ratio is more than this range, compatibility is deteriorated. The weight average molecular weight of the polyalkylene glycol compound is preferably 200 or more and 3000 or less, and more preferably 500 or more and 1500 or less.

[Structural Unit of Polyalkylene Glycol]

Polyalkylene glycols include those of various chemical structures, but a basic compound thereof is polyethylene glycol, polypropylene glycol, polybutylene glycol, or the like. The unit structure thereof is oxyethylene, oxypropylene, or oxybutylene, and polyalkylene glycols can be obtained by subjecting each monomer, ethylene oxide, propylene oxide, or butylene oxide, as a raw material, to ring-opening polymerization.

Examples of the polyalkylene glycol include a compound represented by the following formula (9):

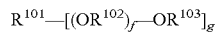
(9)

[$R^{101}$ represents a hydrogen atom, an alkyl group having 1 to 10 carbon atoms, an acyl group having 2 to 10 carbon atoms or a residue of a compound having 2 to 8 hydroxyl groups, $R^{102}$ represents an alkylene group having 2 to 4 carbon atoms, $R^{103}$ represents a hydrogen atom, an alkyl group having 1 to 10 carbon atoms or an acyl group having 2 to 10 carbon atoms, f represents an integer of 1 to 80, and g represents an integer of 1 to 8.]

In the above formula (9), the alkyl group represented by each of $R^{101}$ and $R^{103}$ may be any of straight, branched and cyclic alkyl groups. The number of carbon atoms of the alkyl group is preferably 1 to 10 and more preferably 1 to 6, If the number of carbon atoms of the alkyl group is more than 10, compatibility with a working medium tends to be deteriorated.

In addition, the alkyl group portion of the acyl group represented by each of $R^{101}$ and $R^{103}$ may be any of straight, branched and cyclic alkyl group portions. The number of carbon atoms of the acyl group is preferably 2 to 10 and more preferably 2 to 6. If the number of carbon atoms of the acyl group is more than 10, compatibility with a working medium may be deteriorated to cause phase separation.

In the case where both of the groups represented by $R^{101}$ and $R^{103}$ are alkyl groups or acyl groups, the groups represented by $R^{101}$ and $R^{103}$ may be the same or different. Furthermore, when g represents 2 or more, a plurality of $R^{101}$ and $R^{103}$ in the same molecule may be the same or different.

In the case where the group represented by $R^{101}$ is a residue of a compound having 2 to 8 hydroxyl groups, this compound may be a chain group or may be a cyclic group.

In the polyalkylene glycol represented by the above formula (9), at least one of $R^{101}$ and $R^{103}$ is preferably an alkyl group (more preferably an alkyl group having 1 to 4 carbon atoms) and particularly preferably a methyl group in terms of compatibility with a working medium.

Furthermore, both of $R^{101}$ and $R^{103}$ are preferably an alkyl group (more preferably alkyl groups having 1 to 4 carbon atoms) and particularly preferably a methyl group in terms of thermal/chemical stability.

Preferably, any one of $R^{101}$ and $R^{103}$ is an alkyl group (more preferably an alkyl group having 1 to 4 carbon atoms) and other thereof is a hydrogen atom, and particularly preferably, one is a methyl group and other is a hydrogen atom, in terms of easiness of production and cost. In addition, both of $R^{101}$ and $R^{103}$ are preferably a hydrogen atom in terms of lubricity and solubility of sludge, $R^{102}$ in the above formula (9) represents an alkylene group having 2 to 4 carbon atoms, and specific examples of such an alkylene group include an ethylene group, a propylene group, and a butylene group. In addition, an oxyalkylene group as a repeating unit represented by $OR^2$ includes an oxyethylene group, an oxypropylene group, and an oxybutylene group. Oxyalkylene groups in the same molecule may be the same, and 2 or more oxyalkylene groups may be included.

With respect to the polyalkylene glycol represented by the above formula (9), a copolymer including an oxyethylene group (EO) and an oxypropylene group (PO) is preferable from the viewpoints of compatibility with a working medium and viscosity-temperature characteristics, and in this case, the proportion (EO)/(PO+EO)) of the oxyethylene group in the sum of the oxyethylene group and the oxypropylene group is preferably in a range from 0.1 to 0.8 and more preferably in a range from 0.3 to 0.6 in terms of baking load and viscosity-temperature characteristics.

In addition, the value of EO/(PO+EO) is preferably in a range from 0 to 0.5, more preferably in a range from 0 to 0.2, and most preferably 0 (namely, propylene oxide homopolymer), in terms of hygroscopicity and thermal and oxidation stability.

In the above formula (9), f represents the number of repetitions of the oxyalkylene group $OR^2$ (degree of polymerization), and represents an integer of 1 to 80. In addition, g represents an integer of 1 to 8. For example, in the case where $R^1$ represents an alkyl group or an acyl group, g represents 1. In the case where $R^{101}$ represents a residue of a compound having 2 to 8 hydroxyl groups, g represents the number of hydroxyl groups in the compound.

In addition, the product (f×g) of f and g is not particularly limited, but it is preferable that the average value of f×g be 6 to 80 in order to satisfy the above-described requirements and performances as the lubricating oil for a refrigerating machine in a well-balanced manner.

The number average molecular weight of the polyalkylene glycol represented by the formula (9) is preferably 500 to 3000, further preferably 600 to 2000 and more preferably 600 to 1500, and it is preferable that n represent a number so that the number average molecular weight of the polyalkylene glycol satisfies the above conditions. In the case where the number average molecular weight of the polyalkylene glycol is too low, lubricity under coexistence with the refrigerant is insufficient. On the other hand, in the case where the number average molecular weight is too high, a composition range in which compatibility with the refrigerant is exhibited under low temperature conditions is narrow, and lubrication failure in a refrigerant compressor and inhibition of heat exchange in an evaporator easily occur.

The hydroxyl value of the polyalkylene glycol is not particularly limited, but it is desirable that the hydroxyl value be 100 mgKOH/g or less, preferably 50 mgKOH/R or less, further preferably 30 mgKOH/g or less, and most preferably 10 mgKOH/g or less.

The polyalkylene glycol according to the present embodiment can be synthesized using a conventionally known method ("Alkylene Oxide Polymers", Shibata, M. et al., Kaibundo, issued on Nov. 20, 1990). For example, the polyalkylene glycol represented by the above formula (9) is obtained by performing addition polymerization of one or more predetermined alkylene oxides to an alcohol ($R^{101}OH$; $R^{101}$ represents the same meaning as in $R^{101}$ in the above formula (9)), and subjecting the hydroxyl group at the end to etherification or esterification. Herein, in the case where two or more different alkylene oxides are used in the production step, the resulting polyalkylene glycol may be any of a random copolymer and a block copolymer, but it is preferably a block copolymer because of tending to be more excellent in oxidation stability and lubricity, and preferably a random copolymer because of tending to be more excellent in low-temperature fluidity.

The kinematic viscosity at 100° C. of the polyalkylene glycol according to the present embodiment is preferably 5 to 20 mm²/s, preferably 6 to 18 mm²/s, more preferably 7 to 16 mm²/s, further preferably 8 to 15 mm/s, and most preferably 10 to 15 mm²/s. If the kinematic viscosity at 100° C. is less than the above lower limit, lubricity under coexistence with the refrigerant is insufficient, and on the other hand, if the kinematic viscosity at 100° C. is more than the above upper limit, a composition range in which compatibility with the refrigerant is exhibited is narrow, and lubrication failure in a refrigerant compressor and inhibition of heat exchange in an evaporator easily occur. In addition, the kinematic viscosity at 40° C. of the polyalkylene glycol is preferably 10 to 200 mm$^2$/s and more preferably 20 to 150 mm$^2$/s. If the kinematic viscosity at 40° C. is less than 10 mm$^2$/s, lubricity and sealability of a compressor tend to be deteriorated, and if the kinematic viscosity at 40° C. is more than 200 mm$^2$/s, a composition range in which compatibility with the refrigerant is exhibited under low temperature conditions tends to be narrow, and lubrication failure in a refrigerant compressor and inhibition of heat exchange in an evaporator tend to easily occur.

In addition, the pour point of the polyalkylene glycol represented by the above formula (9) is preferably −10° C. or lower and more preferably −20 to −50° C. If a polyalkylene glycol having a pour point of −10° C. or higher is used, the refrigerating machine oil tends to be solidified at a low temperature in the refrigerant circulation system.

In addition, in the production step of the polyalkylene glycol of the above formula (9), alkylene oxides such as propylene oxide may cause a side reaction and thus an unsaturated group such as an aryl group may be formed in the molecule. If an unsaturated group is formed in the polyalkylene glycol molecule, the following phenomenon easily occurs: the thermal stability of the polyalkylene glycol itself is deteriorated, a polymerized produce is generated to generate sludge, or antioxidative property (oxidation prevention property) is deteriorated to generate peroxide. In particular, if peroxide is generated, it is decomposed to generate a compound having a carbonyl group, and the compound having a carbonyl group further generates sludge to easily cause blockage of a capillary.

Accordingly, as the polyalkylene glycol according to the present embodiment, one in which the degree of unsaturation due to an unsaturated group and the like is low is preferable, and specifically, the degree of unsaturation is preferably 0.04 meq/g or less, more preferably 0.03 meq/g or less, and most preferably 0.02 meq/g or less. In addition, the peroxide value is preferably 10.0 meq/kg or less, more preferably 5.0 meq/kg or less, and most preferably 1.0 meq/kg. Furthermore, the carbonyl value is preferably 100 ppm by weight or less, more preferably 50 ppm by weight or less, and most preferably 20 ppm by weight or less.

In the present embodiment, in order to obtain a polyalkylene glycol in which the degree of unsaturation, the peroxide value and the carbonyl value are low, it is preferable that the reaction temperature at which propylene oxide is reacted be 120° C. or lower (more preferably 110° C. or lower). In addition, if an alkali catalyst is used during the production, an inorganic adsorbent such as activated carbon, activated white earth, bentonite, dolomite, or aluminosilicate can be used for removing the catalyst, to thereby reduce the degree of unsaturation. In addition, it is possible to prevent the increase in peroxide value or carbonyl value also by avoiding the polyalkylene glycol being in contact with oxygen as much as possible during its production or use, or by adding an antioxidant.

While it is required for the polyalkylene glycol compound in the present embodiment that the carbon/oxygen molar ratio is in a predetermined range, a polymer whose molar ratio is in the above range can be produced by selecting and regulating the types and the mixing ratio of the raw material monomers.

The content of the polyol ester, the polyvinyl ether or the polyalkylene glycol compound in the refrigerating machine oil is preferably 80% by mass or more and particularly preferably 90% by mass or more in total based on the total amount of the refrigerating machine oil in order that the refrigerating machine oil is excellent in characteristics demanded, such as lubricity, compatibility, thermal/chemical stability, and electrical insulation property. As the base oil, a mineral oil, a hydrocarbon-based oil such as an olefin polymer, a naphthalene compound and alkylbenzenes, and an oxygen-containing synthetic oil such as carbonates, ketones, polyphenyl ethers, silicones, polysiloxanes and perfluoroethers can be used in combination but the polyol ester, the polyvinyl ether and the polyalkylene glycol compound described later. As the oxygen-containing synthetic oil, among them, carbonates or ketones are preferably used.

The kinematic viscosity of the refrigerating machine oil is not particularly limited, but the kinematic viscosity at 40° C. can be preferably set to 3 to 1000 mm$^2$/s, more preferably 4 to 500 mm2/s, and most preferably 5 to 400 mm$^2$/s. In addition, the kinematic viscosity at 100° C. can be preferably set to 1 to 100 mm$^2$/s and more preferably 2 to 50 mm$^2$/s.

The volume resistivity of the refrigerating machine oil is not particularly limited, but it can be preferably set to $1.0 \times 10^9$ Ω·m or more, more preferably $1.0 \times 10^{10}$ Ω·m or more, and most preferably $1.0 \times 10^{11}$ Ω·m or more. In particular, in the case where the refrigerating machine oil is used for a closed type refrigerating machine, a high electrical insulation property tends to be required. In the present invention, the volume resistivity means the value at 25° C. measured according to JIS C 2101 "Electrical Insulation Oil Test Method".

The moisture content in the refrigerating machine oil is not particularly limited, but it can be preferably set to 200 ppm or less, more preferably 100 ppm or less, and most preferably 50 ppm or less based on the total amount of the refrigerating machine oil. In particular, in the case where the refrigerating machine oil is used for a closed type refrigerating machine, the moisture content is demanded to be low from the viewpoint of the influence on thermal/chemical stability and the electrical insulation property of the refrigerating machine oil.

The acid value of the refrigerating machine oil is not particularly limited, but it can be preferably set to 0.1 mgKOH/g or less and more preferably 0.05 mgKOH/g or less in order to prevent corrosion of a metal used for a refrigerating machine or a pipe, and to prevent decomposition of the ester contained in the refrigerating machine oil according to the present embodiment. In the present invention, the acid value means the acid value measured according to JIS K2501 "Petroleum. Products And Lubricating Oils-Neutralization Value Test Method".

The ash content of the refrigerating machine oil is not particularly limited, but it can be preferably set to 100 ppm or less and more preferably 50 ppm or less in order to increase the thermal/chemical stability of the refrigerating machine oil according to the present embodiment and to suppress the occurrence of sludge or the like. In the present invention, the ash content means the value of the ash content measured according to JIS K2272 "Crude Oil/Petroleum Product Ash Content and Sulfated Ash Content Test Method".

The working fluid composition for a refrigerating machine according to the present embodiment can also be used in the form of being blended with various additives, if necessary. While the content of the additives is shown based on the total amount of a refrigerating machine oil composition, the content of these components in the fluid composition for a refrigerating machine is preferably 5% by mass or less and particularly preferably 2% by mass or less based on the total amount of a refrigerating machine oil composition.

In order to further improve the wear resistance and the load carrying capacity of the working fluid composition for a refrigerating machine according to the present embodiment, it is possible to blend at least one phosphorus compound selected from the group consisting of phosphates, acidic phosphates, thiophosphates, amine salts of acidic phosphates, chlorinated phosphates, and phosphites. These phosphorus compounds are esters of phosphoric acid or phosphorous acid and an alkanol or a polyether type alcohol, or derivatives thereof.

In addition, the working fluid composition for a refrigerating machine according to the present embodiment may contain at least one epoxy compound selected from a phenylglycidylether type epoxy compound, an alkylglycidylether type epoxy compound, a glycidylester type epoxy compound, an allyloxysilane compound, an alkyloxysilane compound, an alicyclic epoxy compound, an epoxidated fatty acid monoester and an epoxidated vegetable oil in order to further improve the thermal/chemical stability thereof.

In addition, the working fluid composition for a refrigerating machine according to the present embodiment may if necessary contain conventionally known additives for a refrigerating machine oil in order to further enhance the performances thereof. Examples of such additives includes a phenol-based antioxidant such as di-tert-butyl-p-cresol and bisphenol A, an amine-based antioxidant such as phenyl-α-naphthylamine and N,N-di(2-naphthyl)-p-phenylenediamine, an antiwear agent such as zinc dithiophosphate, an extreme pressure agent such as chlorinated paraffins and a sulfur compound, an oilness agent such as fatty acids, a antifoaming agent such as silicones, a metal deactivator such as benzotriazole, a viscosity index improver, a pour point depressant, and a detergent dispersant. These additives may be used singly or in combination of two or more.

The working fluid composition for a refrigerating machine according to the present embodiment is preferably used for a room air-conditioner and a cold storage chamber having a closed type reciprocating or rotating compressor, or an open-type or closed type car air-conditioner. In addition, the working fluid composition for a refrigerating machine and the refrigerating machine oil according to the present embodiment are preferably used for a cooling apparatus or the like of a dehumidifier, a water heater, a refrigerator, a refrigeration and cooling warehouse, a vending machine, a showcase, a chemical plant, or the like. Furthermore, the working fluid composition for a refrigerating machine and the refrigerating machine oil according to the present embodiment are also preferably used for one having a centrifugal compressor.

EXAMPLES

Hereinafter, the present invention is more specifically described based on Examples and Comparative Examples, but the present invention is not limited to the following Examples at all.

[Refrigerating Machine Oil]

First, 0.1% by mass of di-ter-butyl-p-cresol (DBPC) as an antioxidant was added to each of base oils 1 to 6 shown below to prepare each of refrigerating machine oils 1 to 6. Various properties of refrigerating machine oils 1 to 6 are shown in Table 1.

[Base Oil]
Base oil 1: ester of mixed fatty acid of 2-ethylhexanoic acid and 3,5,5-trimethylhexanoic acid (mixing ratio (molar ratio): 50/50) with pentaerythritol. Carbon/oxygen molar ratio: 4.8
Base oil 2: ester of mixed fatty acid of n-pentanoic acid, n-heptanoic acid and 3,5,5-trimethylhexanoic acid (mixing ratio (molar ratio): 40/40/20) with pentaerythritol. Carbon/oxygen molar ratio: 3.3
Base oil 3: ester of oleic acid and trimethylolpropane. Carbon/oxygen molar ratio: 9.8
Base oil 4: copolymer of ethyl vinyl ether and isobutyl vinyl ether (ethyl vinyl ether/isobutyl vinyl ether=7/1 (molar ratio)). Weight average molecular weight: 910; carbon/oxygen molar ratio: 4.3
Base oil 5: compound in which both, ends of polypropylene glycol were methyl-etherified. Weight average molecular weight: 1100; carbon/oxygen molar ratio: 2.9
Base oil 6: compound being copolymer of polyoxyethylene glycol and polyoxypropylene glycol, wherein one end was methyl-etherified. Weight average molecular weight: 1700; carbon/oxygen molar ratio: 2.7

TABLE 1

|  | Refrigerating machine oil 1 | Refrigerating machine oil 2 | Refrigerating machine oil 3 |
| --- | --- | --- | --- |
| Base oil | Base oil 1 | Base oil 2 | Base oil 3 |
| Carbon/oxygen molar ratio | 4.8 | 3.3 | 9.8 |
| Kinematic viscosity at 40° C. [mm$^2$/s] | 68.3 | 28.5 | 48.3 |
| Kinematic viscosity at 100° C. [mm$^2$/s] | 8.31 | 5.50 | 9.20 |
| Volume resistivity [Ω · m] | $5 \times 10^{11}$ | $6 \times 10^{11}$ | $5 \times 10^{11}$ |
| Moisture content [ppm] | 45 | 56 | 50 |
| Acid value [mgKOH/g] | 0.01 | 0.01 | 0.01 |
| Hydroxyl group [mgKOH/g] | 2.1 | 1.8 | 2.0 |
| Ash content (ppm by mass) | 0.1 | 0.1 | 0.1 |

|  | Refrigerating machine oil 4 | Refrigerating machine oil 5 | Refrigerating machine oil 6 |
| --- | --- | --- | --- |
| Base oil | Base oil 4 | Base oil 5 | Base oil 6 |
| Carbon/oxygen molar ratio | 4.3 | 2.9 | 2.7 |
| Kinematic viscosity at 40° C. [mm$^2$/s] | 66.4 | 46.5 | 73.2 |
| Kinematic viscosity at 100° C. [mm$^2$/s] | 8.15 | 9.70 | 15.3 |
| Volume resistivity [Ω · m] | $9 \times 10^{10}$ | $1 \times 10^{9}$ | $1 \times 10^{9}$ |
| Moisture content [ppm] | 87 | 95 | 97 |
| Acid value [mgKOH/g] | 0.01 | 0.01 | 0.01 |
| Hydroxyl group [mgKOH/g] | 1.5 | 4.8 | 7.5 |
| Ash content (ppm by mass) | 0.1 | 0.1 | 0.1 |

Examples 1 to 8 and Comparative Examples 1 to 12

In each of Examples 1 to 8 and Comparative Examples 1 to 12, with respect to each working fluid co reposition for a refrigerating machine in which each of refrigerating machine oils 1 to 6 was combined with each refrigerant shown in Tables 2 to 4, evaluation tests shown below were performed. As described later, the mass ratio of the refrigerant to the refrigerating machine oil in the working fluid composition for a refrigerating machine was changed with respect to each test.

As the refrigerant, the followings were used. Mixed refrigerant A-1 was set in favor of refrigerant characteristics for the increase in efficiency, and the GWP thereof was 300 or less, specifically 272. Mixed refrigerant A-2 was set for a further reduction in GWP, and the GWP thereof was 150 or less, specifically 138. Herein, C-134a, whose GWP was as high as 1300, was currently used widely as a refrigerant, and therefore used for comparison.

[Refrigerant]
Mixed refrigerant A-1: R290/HFC-32/HFO-1234yf=10/40/50 (mass ratio, GWP: 272)
Mixed refrigerant A-2: r600a/HFC-32/HFO-1234yf=20/20/60 (mass ratio, GWP: 138)
BFC-32: difluoromethane (GWP: 675)
HFO-1234yf: 2,3,3,3-tetrafluoropropene ((MP: 4)
HFC-134a: 1,1,1,2-tetrafluoroethane (GWP: 1300)
R290: propane (GWP: 3)
R600a: isobutane (GWP: 3)

Then, with respect to each of the working fluid compositions for a refrigerating machine in Examples 1 to 8 and Comparative Examples 1 to 12, evaluation tests shown below were performed. The results are shown in Tables 2 to 4.

[Evaluation of Compatibility]

According to JIS-K-2211, "Test Method of Compatibility of Refrigerating machine Oil with Refrigerant", 2 g of each refrigerating machine oil was blended with 18 g of each of the above refrigerants including the mixed refrigerants, and whether the refrigerant and the refrigerating machine oil were dissolved in each other at 0° C. or not was observed. The results obtained are shown in Tables 2 to 4. In Tables, "Compatible" means that the refrigerant and the refrigerating machine oil were dissolved in each other and "Separated" means that the frigerant and the refrigerating machine oil were separated to two layers.

[Evaluation of Thermal/Chemical Stability]

According to JIS-K-2211, 1 g of a refrigerating machine oil (initial ASTM color L: 0.5) in which the moisture content was adjusted to 100 ppm or less, 1 g of each of various refrigerants described above, and a catalyst (wire of each of iron, copper and aluminum) were enclosed into a glass tube, and then the resultant was placed in a protective tube made of iron, and heated to 175° C. and kept therein for one week. After the test, the ASTM color of the refrigerating machine oil and the change in color of the catalyst color were evaluated. The ASTM color was evaluated according to ASTM D156. In addition, the change in color of the catalyst was evaluated by visually observing the appearance for rating as no change, no gloss, or blackened. In the case of no gloss or blackened, the mixed liquid of the refrigerating machine oil and the refrigerant, namely, a working fluid can be said to be deteriorated. The results obtained in in Tables 2 to 4.

TABLE 2

|  |  | Example 1 | Example 2 | Example 3 |
|---|---|---|---|---|
| Refrigerating machine oil |  | Refrigerating machine oil 1 | Refrigerating machine oil 1 | Refrigerating machine oil 2 |
| Refrigerant |  | Mixed refrigerant A-1 | Mixed refrigerant A-2 | Mixed refrigerant A-1 |
| GWP |  | 272 | 138 | 272 |
| Compatibility |  | Compatible | Compatible | Compatible |
| Thermal/chemical stability | ASTM color (ASTM D156) | L0.5 | L0.5 | L0.5 |
|  | Appearance of catalyst Cu | No change | No change | No change |
|  | Appearance of catalyst Fe | No change | No change | No change |
|  | Appearance of catalyst Al | No change | No change | No change |

|  |  | Example 4 | Example 5 | Example 6 |
|---|---|---|---|---|
| Refrigerating machine oil |  | Refrigerating machine oil 2 | Refrigerating machine oil 4 | Refrigerating machine oil 4 |
| Refrigerant |  | Mixed refrigerant A-2 | Mixed refrigerant A-1 | Mixed refrigerant A-2 |
| GWP |  | 138 | 272 | 138 |
| Compatibility |  | Compatible | Compatible | Compatible |
| Thermal/chemical stability | ASTM color (ASTM D156) | L0.5 | L0.5 | L0.5 |
|  | Appearance of catalyst Cu | No change | No change | No change |
|  | Appearance of catalyst Fe | No change | No change | No change |
|  | Appearance of catalyst Al | No change | No change | No change |

TABLE 3

|  |  | Example 7 | Example 8 | Comparative Example 1 | Comparative Example 2 |
|---|---|---|---|---|---|
| Refrigerating machine oil |  | Refrigerating machine oil 5 | Refrigerating machine oil 6 | Refrigerating machine oil 3 | Refrigerating machine oil 3 |
| Refrigerant |  | Mixed refrigerant A-1 | Mixed refrigerant A-2 | Mixed refrigerant A-1 | Mixed refrigerant A-2 |
| GWP |  | 272 | 138 | 272 | 138 |
| Compatibility |  | Compatible | Compatible | Separated | Separated |
| Thermal/chemical stability | ASTM color (ASTM D156) | L0.5 | L0.5 | L0.5 | L0.5 |
|  | Appearance of catalyst Cu | No change | No change | No change | No change |
|  | Appearance of catalyst Fe | No change | No change | No change | No change |
|  | Appearance of catalyst Al | No change | No change | No change | No change |

TABLE 3-continued

|  |  | Comparative Example 3 | Comparative Example 4 | Comparative Example 5 |
|---|---|---|---|---|
| Refrigerating machine oil | | Refrigerating machine oil 3 | Refrigerating machine oil 3 | Refrigerating machine oil 3 |
| Refrigerant | | HFC-134a | HFC-32 | HFO-1234yf |
| GWP | | 1300 | 675 | 4 |
| Compatibility | | Separated | Separated | Separated |
| Thermal/chemical stability | ASTM color (ASTM D156) | L0.5 | L0.5 | L1.0 |
| | Appearance of catalyst Cu | No change | No change | No gloss |
| | Appearance of catalyst Fe | No change | No change | No gloss |
| | Appearance of catalyst Al | No change | No change | No change |

TABLE 4

|  |  | Comparative Example 6 | Comparative Example 7 | Comparative Example 8 | Comparative Example 9 |
|---|---|---|---|---|---|
| Refrigerating machine oil | | Refrigerating machine oil 1 | Refrigerating machine oil 1 | Refrigerating machine oil 2 | Refrigerating machine oil 4 |
| Refrigerant | | HFC-32 | HFO-1234yf | HFC-32 | HFO-1234yf |
| GWP | | 675 | 4 | 675 | 4 |
| Compatibility | | Separated | Compatible | Separated | Compatible |
| Thermal/chemical stability | ASTM color (ASTM D156) | L0.5 | L1.0 | L0.5 | L1.0 |
| | Appearance of catalyst Cu | No change | No gloss | No change | No gloss |
| | Appearance of catalyst Fe | No change | No gloss | No change | No gloss |
| | Appearance of catalyst Al | No change | No change | No change | No change |

|  |  | Comparative Example 10 | Comparative Example 11 | Comparative Example 12 |
|---|---|---|---|---|
| Refrigerating machine oil | | Refrigerating machine oil 4 | Refrigerating machine oil 5 | Refrigerating machine oil 6 |
| Refrigerant | | HFC-32 | HFO-1234yf | HFC-32 |
| GWP | | 675 | 4 | 675 |
| Compatibility | | Separated | Compatible | Separated |
| Thermal/chemical stability | ASTM color (ASTM D156) | L0.5 | L2.0 | L0.5 |
| | Appearance of catalyst Cu | No change | No gloss | No change |
| | Appearance of catalyst Fe | No change | No gloss | No change |
| | Appearance of catalyst Al | No change | No change | No change |

Examples 9 to 18 and Comparative Examples 13 to 20

In each of Examples 9 to 18 and Comparative Examples 13 to 20, the above evaluation tests ([Evaluation of refrigerant compatibility], [Evaluation of thermal/chemical stability]) were performed with respect to each working fluid composition for a refrigerating machine in which any of refrigerating machine oils 1 to 5 and any of refrigerants shown in Tables 5 to 7 are combined. As described later, the mass ratio of the refrigerant to the refrigerating machine oil in the working fluid composition for a refrigerating machine was changed with respect to each of the tests.

As the refrigerant, the following three mixed refrigerants B-1, B-2, and B-3, in which HFC-32, HFO-1234yf itself and R744 were mixed, were used. Mixed refrigerant B-1 was a mixed refrigerant of three refrigerants, HFC-32, HFO-1234yf and R744, and the GWP thereof was 300 or less. While no test method for discriminating the boundary between "non-flammable" and "low flammable" is established with respect to burning property, burning property is decreased as the proportion of non-flammable R744 is increased. Mixed refrigerant B-2 was a mixed refrigerant of HFO-1234yf and R744, and the GWP thereof was as extremely low as 3. Mixed refrigerant B-3 was a refrigerant in which the proportion of HFC-32 for the increase in efficiency was increased and R744 was mixed to thereby intend to achieve "non-flammable", and the GWP thereof was 405.

[Refrigerant]
HFC-32: difluoromethane (GWP: 675)
HFO-1234yf: 2,3,3,3-tetrafluoropropene (GWP: 4)
R744: carbon dioxide (GWP: 1)
Mixed refrigerant B-1: HFC-32/HFO-1234yf/R744=40/40/20 (mass ratio, GWP: 272)
Mixed refrigerant B-2: HFO-1234yf/R744=70/30 (mass ratio, GWP: 3)
Mixed refrigerant B-3: HFC-32/R744=60/40 (mass ratio, GWP 405)

TABLE 5

|  |  | Example 9 | Example 10 | Example 11 |
|---|---|---|---|---|
| Refrigerating machine oil | | Refrigerating machine oil 1 | Refrigerating machine oil 1 | Refrigerating machine oil 1 |
| Refrigerant | | Mixed refrigerant B-1 | Mixed refrigerant B-2 | Mixed refrigerant B-3 |
| GWP | | 272 | 3 | 405 |
| Compatibility | | Compatible | Compatible | Compatible |
| Thermal/ chemical stability | ASTM color (ASTM D156) | L0.5 | L1.0 | L0.5 |
| | Appearance of catalyst Cu | No change | No change | No change |
| | Appearance of catalyst Fe | No change | No change | No change |
| | Appearance of catalyst Al | No change | No change | No change |

|  |  | Example 12 | Example 13 | Example 14 |
|---|---|---|---|---|
| Refrigerating machine oil | | Refrigerating machine oil 2 | Refrigerating machine oil 2 | Refrigerating machine oil 4 |
| Refrigerant | | Mixed refrigerant B-1 | Mixed refrigerant B-2 | Mixed refrigerant B-1 |
| GWP | | 272 | 3 | 272 |
| Compatibility | | Compatible | Compatible | Compatible |
| Thermal/ chemical stability | ASTM color (ASTM D156) | L0.5 | L1.0 | L0.5 |
| | Appearance of catalyst Cu | No change | No change | No change |
| | Appearance of catalyst Fe | No change | No change | No change |
| | Appearance of catalyst Al | No change | No change | No change |

TABLE 6

|  |  | Example 15 | Example 16 | Example 17 |
|---|---|---|---|---|
| Refrigerating machine oil | | Refrigerating machine oil 4 | Refrigerating machine oil 4 | Refrigerating machine oil 5 |
| Refrigerant | | Mixed refrigerant B-2 | Mixed refrigerant B-3 | Mixed refrigerant B-1 |
| GWP | | 3 | 405 | 272 |
| Compatibility | | Compatible | Compatible | Compatible |
| Thermal/ chemical stability | ASTM color (ASTM D156) | L1.0 | L0.5 | L0.5 |
| | Appearance of catalyst Cu | No change | No change | No change |
| | Appearance of catalyst Fe | No change | No change | No change |
| | Appearance of catalyst Al | No change | No change | No change |

|  |  | Example 18 | Comparative Example 13 | Comparative Example 14 |
|---|---|---|---|---|
| Refrigerating machine oil | | Refrigerating machine oil 5 | Refrigerating machine oil 3 | Refrigerating machine oil 3 |
| Refrigerant | | Mixed refrigerant B-3 | Mixed refrigerant B-1 | Mixed refrigerant B-2 |
| GWP | | 405 | 272 | 3 |
| Compatibility | | Compatible | Separated | Separated |
| Thermal/ chemical stability | ASTM color (ASTM D156) | L0.5 | L0.5 | L1.0 |
| | Appearance of catalyst Cu | No change | No change | No change |
| | Appearance of catalyst Fe | No change | No change | No change |
| | Appearance of catalyst Al | No change | No change | No change |

TABLE 7

|  |  | Comparative Example 15 | Comparative Example 16 | Comparative Example 17 |
|---|---|---|---|---|
| Refrigerating machine oil | | Refrigerating machine oil 3 | Refrigerating machine oil 1 | Refrigerating machine oil 1 |
| Refrigerant | | Mixed refrigerant B-3 | HFC-32 | HFO-1234yf |
| GWP | | 405 | 675 | 4 |
| Compatibility | | Separated | Separated | Compatible |
| Thermal/ chemical stability | ASTM color (ASTM D156) | L0.5 | L0.5 | L1.5 |
| | Appearance of catalyst Cu | No change | No change | No gloss |
| | Appearance of catalyst Fe | No change | No change | No gloss |
| | Appearance of catalyst Al | No change | No change | No change |

|  |  | Comparative Example 18 | Comparative Example 19 | Comparative Example 20 |
|---|---|---|---|---|
| Refrigerating machine oil | | Refrigerating machine oil 2 | Refrigerating machine oil 4 | Refrigerating machine oil 5 |
| Refrigerant | | HFC-32 | HFC-32 | HFO-1234yf |
| GWP | | 675 | 675 | 4 |
| Compatibility | | Separated | Separated | Compatible |
| Thermal/ chemical stability | ASTM color (ASTM D156) | L0.5 | L0.5 | L2.0 |
| | Appearance of catalyst Cu | No change | No change | No gloss |
| | Appearance of catalyst Fe | No change | No change | No gloss |
| | Appearance of catalyst Al | No change | No change | No change |

With respect to the working fluid composition for a refrigerating machine in each of Examples 1 to 8 shown in Tables 2 and 3 and Examples 9 to 18 shown in Tables 5 and 6, the GWP of all the refrigerants was as low as 500 or less, the compatibility of the refrigerant with the refrigerating machine oil was also no problematic, the thermal/chemical stability was also good, and the working fluid for a refrigerating machine could be said to be an excellent working fluid for a refrigerating machine.

On the other hand, with respect to the working fluid composition for a refrigerating machine in each of Comparative Examples 1 and 2 shown in Table 3 and Comparative Examples 13 to 15 shown in Tables 6 and 7, while refrigerating machine oil 3 in Table 1, whose carbon/oxygen molar ratio was out of the range of the present invention, was used, it was not compatible with the refrigerant, and thus the working fluid composition for a refrigerating machine is difficult to use as a refrigerating machine oil.

In addition, with respect to the working fluid composition for a refrigerating machine in each of Comparative Examples 3 to 6, 8, 10, 12, 16, 18 and 19, the compatibility of the refrigerant with the refrigerating machine oil was not satisfactory. Furthermore, in each of Comparative Examples 3, 4, 6, 10, 12, 16, 18 and 19, the GWP of the refrigerant was also slightly high.

With respect to the working fluid composition for a refrigerating machine in each of Comparative Examples 5, 7, 9, 11, 17 and 20, since deterioration due to change in color of each oil tested and change of properties of the catalyst were observed, and thermal/chemical stability was poor, the working fluid composition for a refrigerating machine could not be said to be a suitable working fluid for a refrigerating machine.

INDUSTRIAL APPLICABILITY

The present invention provides a working fluid composition for use in a refrigerating machine which contains a refrigerant having a low GWP and containing a refrigerant such as a hydrocarbon, difluoromethane, and an unsaturated hydrofluorocarbon is used, and the composition can be used as a working fluid at a high efficiency in a refrigeration system having a compressor, a condenser, a throttle device, an evaporator, and the like among which the refrigerant is circulated, in particular, in a refrigerating machine having a compressor such as a rotary-type, swing-type, or scrolling-type compressor, and can be suitably used in the fields of a room air-conditioner, an all-in-one air conditioner, a cold storage chamber, a car air-conditioner, an industrial refrigerating machine, and the like.

The invention claimed is:

1. A working fluid composition for a refrigerating machine, comprising:
   a refrigerant, comprising
     a first refrigerant component and
     a second refrigerant component,
   the refrigerant having a global warming potential (GWP) of 500 or less,
     wherein
       the first refrigerant component is at least one selected from
         difluoromethane and
         tetrafluoropropene, and
       the second refrigerant component is a hydrocarbon having 3 to 4 carbon atoms, and
       the sum of difluoromethane, tetrafluoropropene and the hydrocarbon is 80% by mass or more based on the total amount of the refrigerant; and
   a refrigerating machine oil comprising at least one selected from a polyol ester and a polyvinyl ether as a base oil, wherein
     a carbon/oxygen molar ratio of the polyol ester is from 3.2 to 5.0, and
     a carbon/oxygen molar ratio of the polyvinyl ether is from 3.2 to 5.8; and
   wherein a mass ratio of the refrigerant to the refrigerating machine oil is 90:10 to 30:70.

2. The working fluid composition for a refrigerating machine according to claim 1, wherein the refrigerant comprises
   hydrocarbon having 3 to 4 carbon atoms,
   difluoromethane and
   tetrafluoropropene, and
   has a global warming potential of 400 or less.

3. The working fluid composition for a refrigerating machine according to claim 2, wherein the refrigerant comprises
   3 to 40 parts by mass of the hydrocarbon having 3 to 4 carbon atoms,
   20 to 60 parts by mass of difluoromethane and
   20 to 70 parts by mass of tetrafluoropropene
   based on 100 parts by mass of the refrigerant.

4. The working fluid composition for a refrigerating machine according to claim 1, wherein the hydrocarbon having 3 to 4 carbon atoms is propane or isobutane, and a global warming potential of the refrigerant is 300 or less.

5. The working fluid composition for a refrigerating machine according to claim 1, wherein the polyol ester has a carbon/oxygen molar ratio of from 4.0 to 5.0, and the polyol ester is obtainable by synthesis from a fatty acid having 4 to 9 carbon atoms and a polyhydric alcohol having 4 to 12 carbon atoms.

6. The working fluid composition for a refrigerating machine according to claim 1, wherein
   the polyvinyl ether has a carbon/oxygen molar ratio of from 4.0 to 5.0, and
   the polyvinyl ether has a structural unit represented by the following formula (1):

wherein
$R^1$, $R^2$ and $R^3$ may be the same or different and each represents a hydrogen atom or a hydrocarbon group having 1 to 8 carbon atoms,
$R^4$ represents a divalent hydrocarbon group having 1 to 10 carbon atoms or an ether bond oxygen-containing divalent hydrocarbon group having 2 to 20 carbon atoms,
$R^5$ represents a hydrocarbon group having 1 to 20 carbon atoms, m represents a number such that an average value of m in the polyvinyl ether is 0 to 10,
$R^1$ to $R^5$ may be the same or different in each occurrence of the structural units, and
when m represents 2 or more in one structural unit, a plurality of $R^4O$ may be the same or different.

* * * * *